United States Patent
Johnson et al.

(10) Patent No.: US 6,618,715 B1
(45) Date of Patent: Sep. 9, 2003

(54) CATEGORIZATION BASED TEXT PROCESSING

(75) Inventors: David E. Johnson, Cortlandt Manor, NY (US); Frederick J. Damerau, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/589,398

(22) Filed: Jun. 8, 2000

(51) Int. Cl.[7] ............................. G06F 17/00; G06N 5/02
(52) U.S. Cl. ............................... 706/47; 706/45; 706/48
(58) Field of Search ......................... 706/47, 45, 48; 707/500

(56) References Cited

U.S. PATENT DOCUMENTS 5,778,157 A * 7/1998 Oatman et al.
6,161,130 A * 12/2000 Horvitz et al.

OTHER PUBLICATIONS

D. Lewis et al., "Text Filtering in MUC–3 and MUC–4", pp. 51–66, in Fourth Message Understanding Conference (MUC–4), McLean, Virginia, Jun. 16–18, 1992.

M. McCord, "Slot Grammar: A system for simpler construction of practical natural language grammars", pp. 118–145 in *Natural Language in Computer Science*, R. Studer, Editor, Springer Verlag, Berlin (1990).

J.S. Brown, et al., "Pedagogical, Natural Language and Knowledge Engineering Techniques in Sophie I, II, and III", in *Intelligent Tutoring Systems*, D. Sleeman and J.S. Brown, Editors, Academic Press, London (1982).

* cited by examiner

*Primary Examiner*—Wilbert L. Starks, Jr.
*Assistant Examiner*—Joseph P. Hirl
(74) *Attorney, Agent, or Firm*—Whitham, Curtis & Christofferson, P.C.; Stephen C. Kaufman

(57) ABSTRACT

A rules based configurable system efficiently and effectively determines for a given electronically represented text document which linguistic analysis and extraction processes and which application specific processes should be invoked to provide more accurate answers to a user's query. In a rules based classifier, where each category or topic is represented by a set of rules, in an application such as routing, the categorization effecting the routing can be effectively combined with processes extracting other information. This may be in the form of a prompt for the user to input additional information.

10 Claims, 2 Drawing Sheets

CATEGORIZATION BASED TEXT PROCESSING

CROSS REFERENCE TO RELATED APPLICATION

The invention of this application is related in subject matter to the disclosure of U.S. patent application Ser. No. 09/589,397 filed concurrently herewith by David E. Johnson, Frank J. Oles, and Tong Zhang for "Tree Based, Symbolic Rule Induction Text System For Text Categorization" and assigned to a common assignee herewith. The disclosure of U.S. patent application Ser. No. 09/589,397 is incorporated herein by reference.

DESCRIPTION

BACKGROUND OF THE INVENTION

1. Field of the Invention

The present invention generally relates to extracting formatted information from unformatted text files, where the appropriate formatting processor is determined by categorizing the textual input into one or more predefined categories.

2. Background Description

Natural language computer interfaces require a natural language analysis engine that can analyze user input text, extract and format information that drives some back end application or process. User input text could be derived, for example, from the output of a speech recognizer or other system that generates text, e.g., an optical character recognition (OCR) system. There is no solution to the general problem of understanding natural language via a computer program. There are two main basic approaches to the problem of computer-based natural language analysis:

(1) Use a general purpose grammar/parser of a particular language and then interpret the output of the parser with a semantic interpreter that uses domain specific knowledge to build an internal, formatted representation of the information needed by the back-end applications or processes. General English parsers are described, for example, by Michael C. McCord in "Slot Grammar: A system for simpler construction of practical natural language grammars", pp. 118–145 in *Natural Language and Logic: International Scientific Symposium, Lecture Notes in Computer Science*, R. Studer, Editor, Springer Verlag, Berlin (1990). The problem with this approach is that general purpose natural language grammars/parsers will typically deliver a large number of parses or structures, representing high level syntactic information; e.g., subject-verb-object-modifier patterns, all but one or a few of which must then be eliminated by the post-parsing semantic interpretation process. This can be extremely computationally inefficient.

(2) Build special purpose so-called semantic grammars that are much less ambiguous than general grammars and support very simple semantic interpretation processes. Semantic grammars are discussed by J. S. Brown, R. R. Burton and J. De Kleer in "Pedagogical, Natural Language and Knowledge Engineering Techniques in Sophie I, II, and III", in Intelligent Tutoring Systems, D. Sleeman and J. S. Brown, Editors, Academic Press, London (1982). The problem with semantic or domain-specific grammars is that a new one must be built for each domain; i.e., there is a portability issue.

There are significant practical problems with both approaches in many real world applications that use natural language interfaces for input. In many real world applications, e.g., electronic mail (e-mail) auto-response or auto-routing systems, or Web-based (the World Wide Web (WWW) portion of the Internet, or simply "the Web") self-service product and services ordering applications, a user input could be about a variety of topics and even worse a single input might refer to a number of topics. For a general purpose parser-based system, the issue is how to invoke the right semantic processing routines in an efficient manner. For a special-purpose semantic grammar-based system, the issue is how to invoke the right grammar(s) for interpretation. Running all the grammars on the data is in general extremely inefficient and can lead to errors in interpretation.

David D. Lewis and Richard M. Tong in "Text Filtering in MUC-3 and MUC-4", pp. 51–66, in *Fourth Message Understanding Conference* (MUC-4), McLean, Va., Jun. 16–18, 1992, describe the emergence of text filtering as an explicit topic of discussion. The processes described, however, do not lend themselves to a solution to the problem of how to invoke the right semantic processing routines in an efficient manner. In the processes described, text documents are categorized into only two types: relevant versus non-relevant. Documents considered relevant are then processed by natural language processing algorithms. There is no suggestion of invoking non-linguistic processes based on categorization; e.g., invoking database queries to gather information for back end application or for humans is not part of the message understanding work. Dynamically categorizing an input document into zero, one or more categories is also not suggested by the message understanding work, nor is the assignment of confidence labels.

What is needed is a configurable system that can efficiently and effectively determine for a given electronically represented text document (e-mail, Web form, scanned facsimile, output of speech recognition, etc.) which linguistic analysis and extraction processes, and even other application specific processes, should be invoked.

SUMMARY OF THE INVENTION

It is therefore an object of the invention to provide a configurable system that can efficiently and effectively determine for a given electronically represented text document which linguistic analysis and extraction processes should be invoked.

It is another object of the present invention to provide a rules based system that can efficiently and effectively determine for a given electronically represented text document which application specific processes should be invoked to provide more accurate answers to a user's query.

Assuming a rules based classifier, where each category or topic is represented by a set of rules, in the preferred embodiment of the invention in applications, e.g., routing, the categorization effecting the routing can be effectively combined with processes extracting other information. For example, if a user sends an e-mail asking about "apply for new home mortgage", the categorization component would identify the general topic for routing as "Home Mortgage" and also invoke extractors extracting name, and other information of relevance for new home mortgage applications. Such information may include, for example, any information indicating the amount of the desired mortgage, whether the person is a current bank customer, location of the property, and the like. In contrast, if the person specifies an interest in "refinancing their current home mortgage", the categorizer might also place this in the "Home Mortgage" category but invoke extractors specific to refinancing inquiries.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
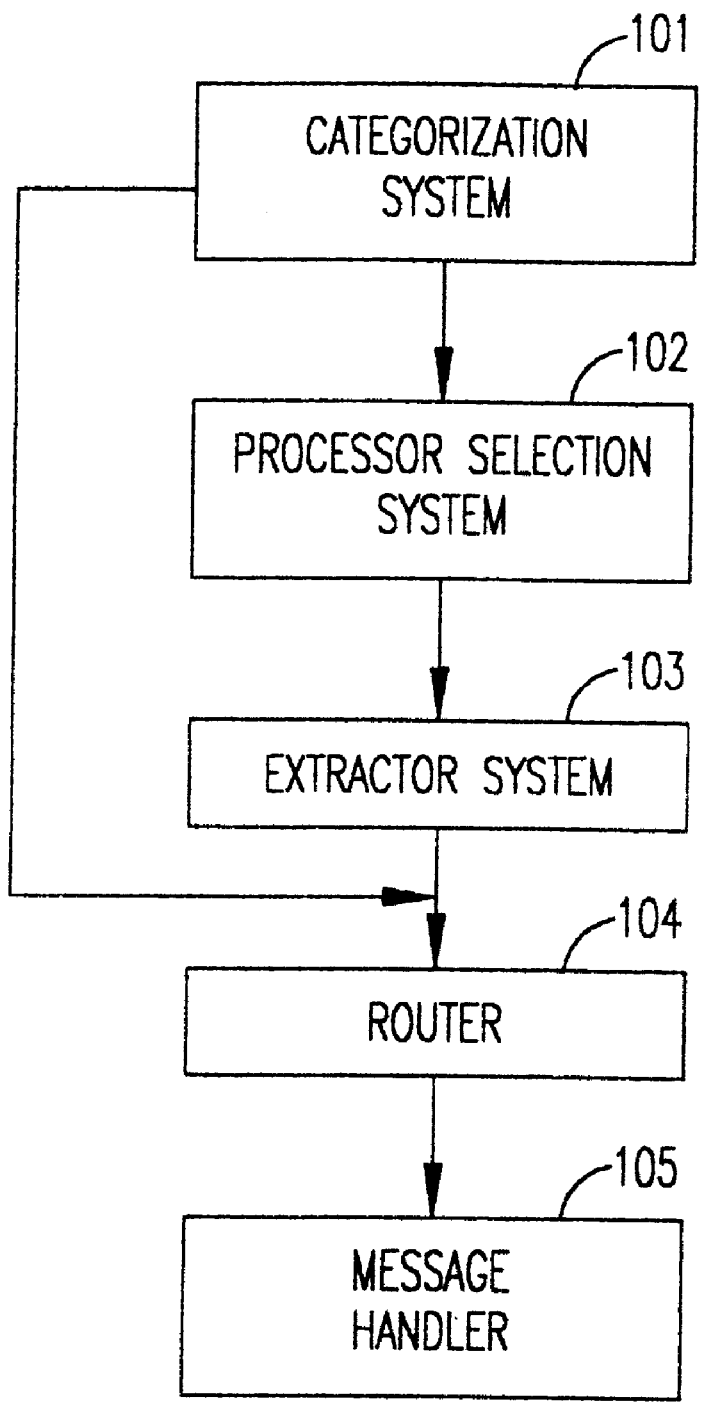
FIG. 1 is a block diagram of the categorization based text processing system according to the invention.

Referring now to the drawings, and specifically to FIG. 1, there is shown a block diagram of the categorization based text processing system of the invention. An input document is categorized by the categorization system 101 and the results of that categorization are output either to the processor selection system 102 or directly to the router 104. At the most general level, the invention solves the problem by a "divide and conquer" technique; that is, associating particular processes with particular categorizations, where any text categorizer could be used for the categorization system 101. In the preferred embodiment, the categorization system 101 is a rules-based classifier, preferably based on supervised machine learning techniques as applied to text categorization, and where symbolic rules are generated using a decision-tree-based induction method, but not precluding manually written or edited rules. An example of such a decision-tree-based symbolic rules induction system for text classification is disclosed in copending U.S. application Ser. No. 09/589,397, supra, and herein incorporated by reference in its entirety.

The "divide and conquer" strategy of the present invention solves these problems by first categorizing the text, using machine learning-based categorization techniques, into a set of zero or more topics, along with optionally, for each topic, a confidence level indicating the degree of confidence the system has that a particular document (document segment) falls into a particular class. Based on the categorization results, the processor selection system 102 then invokes (i) in the general purpose parser case, the particular semantic routines relevant to a particular set of categorization (topic) results or (ii) in the semantic-based grammar, the particular semantic grammars relevant to a particular set of categorization (topic) results, or other topic specific processes. The extractor system 103 then generates formatted data which is supplied to router 104. Some documents may not require extraction. In that case, the categories assigned are used immediately for routing. Data from the extractor system 103 or the categorization system 101 is directed by the router 104 to the appropriate message handler 105.

In the preferred embodiment where the categorization system 101 provides confidence levels with each categorization instance, the confidence levels (which range up to 100%) can be used either absolutely, i.e., if the confidence level for a category is too low, the corresponding grammar or semantic routines are not invoked, or in relative fashion, i.e., the categories are ranked by confidence level and only the top k semantic routines or confidence levels are invoked. That is, the general concept is that semantic processing routines, parsing routines, or other linguistic processing information extraction routines or other topic specific processes are effectively indexed by the categorization (and confidence level) values. In further elaboration, the actions taken (processes invoked) can be based on a Boolean combination of the categories (and confidence levels) output by the categorization system 101.

In the general case, a set of categorization results determine the invoked linguistic processing routines of the processor selection system 102, as shown schematically in the table below, where we have an based on three values: Y (Yes), N (no), * (don't care). The table is for purposes of illustration only, and is an example of Text Processing Action-Logic based on Categorization.

| Invoked Routines | | CATEGORIZATION RESULTS | | | | | |
|---|---|---|---|---|---|---|---|
| | | C1 | C2 | C3 | C4 | ... | Cr |
| #1 | If | Y | Y | N | N | ... | N |
| #2 | If | Y | N | N | N | ... | N |
| #3 | If | Y | Y | * | N | ... | * |
| #4 | If | Y | * | * | * | ... | * |
| . | | | | | | | |
| . | | | | | | | |
| #к | | | | | | | |

Figure 2:
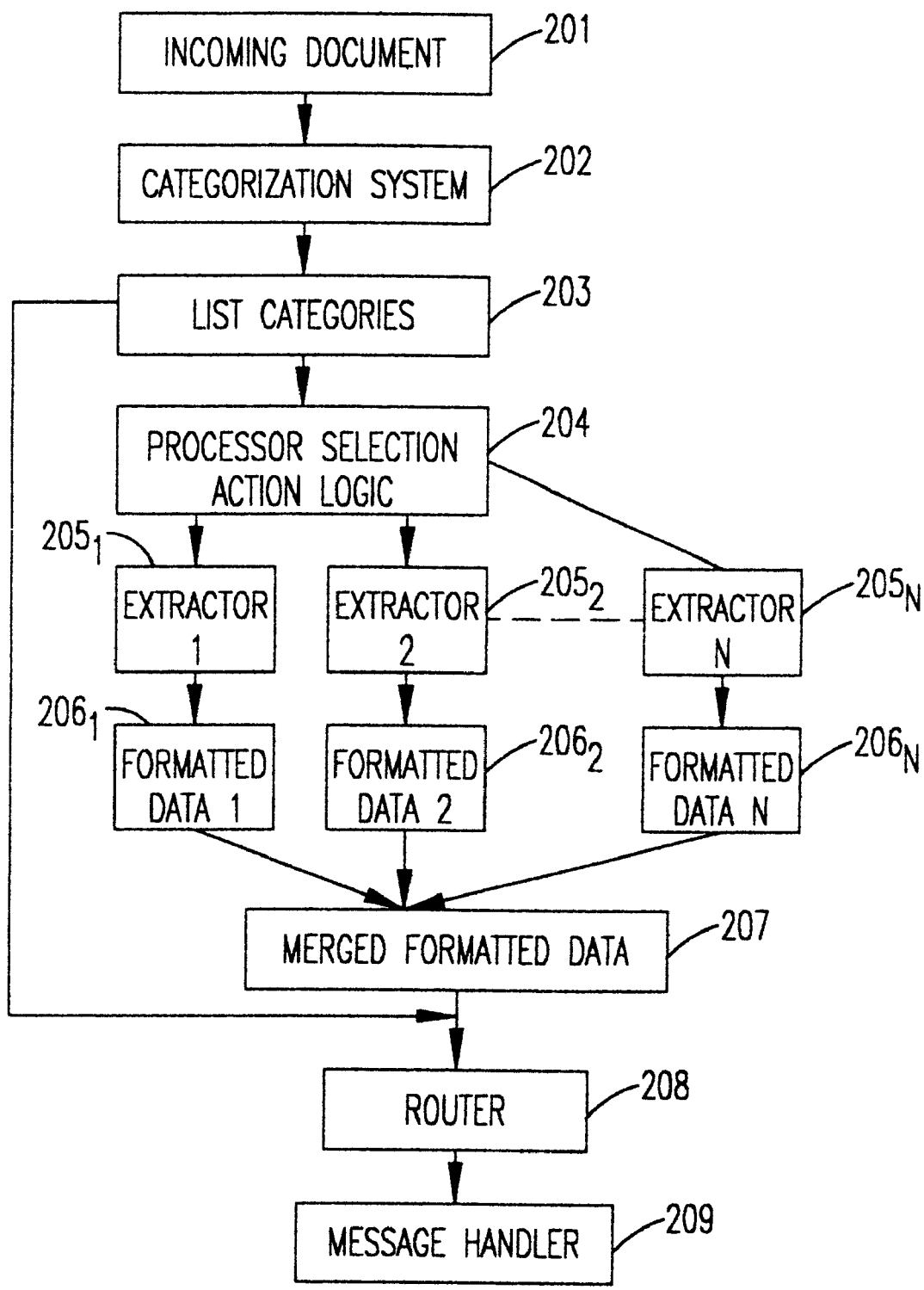
FIG. 2 is a flow diagram showing the logic of an implementation of the categorization based text processing method according to the invention.

The process implemented on the system of FIG. 1 is shown in the flow diagram of FIG. 2. An incoming document 201 is input to the categorization system 202 which outputs a list of categories 203. This list of categories is supplied to the processor selection action logic 204. As an example for illustrative purposes, suppose that routine #1 is "extract account number", routine #2 is "extract balance" and routine #3 is "extract customer name". Suppose also that the categorizer returns as categories C1 "checking account balance" and C2 "order checks". According to the action table above, formatted data for the customer name, account number and balance will be extracted for the category "checking account balance", but only customer name and account number for the category "order checks" since, presumably, the message handler for "order checks" does not need the account balance. Depending on the invoked linguistic processing routines, one or more extractor routines $205_1, 205_2, \ldots, 205_N$ are invoked. The extractor routine(s) output formatted data $206_1, 206_2, \ldots, 206_N$, which is merged in function block 207. The merged formatted data is then passed to the router function 208 which directs the merged formatted data to the appropriate message handler function 209.

A new input (user document, query, document from an automatic agent, document from a speech recognizer, facsimile machine, etc.) comes into the system. This document is categorized into zero, one or more categories (and optionally associated confidence levels). A determination is made according to the action-logic 204 as to which grammars, semantic processing routines or other information processing routines or application processes should be invoked.

As an illustration, each category might be associated with a template, which is a set of attributes, whose values are to be filled in by a linguistic processing routine. For instance, in a banking application which automatically processes customer e-mail, a query about a new home mortgage loan application mentioning the amount and type of the desired mortgage would be categorized as a "Mortgage Loan Application", leading to the processing of an associated form with attributes for the person's name, e-mail address, loan amount, loan type, etc. This information could then be used by a customer service person or other computer applications. For example, the information could be used to automatically generate a data base query to look for pertinent information, such as the person's credit history, etc. The point is that a banking application would have many topics, such as, for example, opening a checking account, missing statement, application for an auto loan, etc., each with a different form or template or back-end process of relevance that would be activated by the category determinations. If there are many topics, as is typical of many businesses, then this "divide and conquer" strategy would make the system more efficient, less error prone, and easier to develop and maintain. It would also simplify the process of extending the system to new topics as one would separately develop categorization routines and templates and category-based special purpose information extraction routines.

In a second scenario, the process is nearly the same as the process just described, but the message handler may determine from the extracted data that the original input, for example a query regarding mortgages, is incomplete, lacking, for example, the desired term of the mortgage. In this case, a query may be generated immediately and perhaps automatically requesting more information from the user.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A configurable system for determining for a given electronically represented text document which linguistic analysis and extraction processes and which application specific processes should be invoked to provide formatted answers to a user's query comprising:

a categorizer receiving an input text document and classifying the text document into zero, one or more categories;

a processor selection system receiving a list of categories from the categorizer and determining which of a plurality of extractor processes to invoke on the input document based on categorization of the input text document into zero, one or more categories; and an extractor system implementing the plurality of extractor processes invoked by the processor selection system for extracting data from the input text document and formatting the extracted data.

2. The configurable system recited in claim 1, wherein the categorizer is a rules based classifier, where each category or topic is represented by a set of rules.

3. The configurable system recited in claim 2, wherein the rules base classifier is a decision-tree-based rule induction system.

4. The configurable system recited in claim 1, wherein the document categorizations are associated with confidence levels.

5. The configurable system recited in claim 1, wherein the system is used in a routing application, further comprising a router receiving data from the extractor system and from the categorizer and routing the data to a message handler based on the output of the categorizer.

6. A computer implemented method of extracting formatted information from unformatted text files to provide formatted answers to a user's query comprising the steps of:

receiving an input text document;

classifying the input text document into zero, one or more categories;

determining which of a plurality of extractor processes to invoke on the input document based on categorization of the input text document;

invoking one or more of said plurality of extractor processes; and extracting data from the input text document and formatting the extracted data.

7. The method of extracting formatted information from unformatted text files to provide formatted answers to a user's query recited in claim 6, wherein the step of classifying is based on a rules based classifier process, where each category or topic is represented by a set of rules.

8. The method as recited in claim 7, wherein each category or topic represented by a set of rules is associated with a confidence level.

9. The method of extracting formatted information from unformatted text files to provide formatted answers to a user's query recited in claim 6, further comprising the steps of:

receiving formatted extracted data; and routing the formatted extracted date to a message handler based on categorization of the input text document.

10. A method as recited in claim 6, wherein the step of determining which of a plurality of extractor processes to invoke on the input document based on categorization of the input text document, further comprises the steps of:

identifying a confidence level for each classified category of the input text document; and selecting a subset of extractor processes associated with a 100% confidence level for each classified category of the input text document, where the plurality of extractor processes to invoke comprises the selected subsets of extractor processes.

* * * * *